May 26, 1964

J. K. WILLIS 3,134,527

TAPE DRIVING MEANS

Filed Jan. 2, 1962

5 Sheets-Sheet 1

JACK K. WILLIS
INVENTOR.

BY Robert G. Clay

ATTORNEY

May 26, 1964 J. K. WILLIS 3,134,527

TAPE DRIVING MEANS

Filed Jan. 2, 1962 5 Sheets-Sheet 2

JACK K. WILLIS
INVENTOR.

BY Robert G. Clay
ATTORNEY

May 26, 1964 J. K. WILLIS 3,134,527

TAPE DRIVING MEANS

Filed Jan. 2, 1962 5 Sheets-Sheet 3

JACK K. WILLIS
INVENTOR.

BY Robert G. Clay

ATTORNEY

May 26, 1964

J. K. WILLIS 3,134,527

TAPE DRIVING MEANS

Filed Jan. 2, 1962

5 Sheets-Sheet 4

JACK K. WILLIS
INVENTOR.

BY Robert G. Clay

ATTORNEY

May 26, 1964 J. K. WILLIS 3,134,527

TAPE DRIVING MEANS

Filed Jan. 2, 1962 5 Sheets-Sheet 5

JACK K. WILLIS
INVENTOR.

BY Robert G. Clay

ATTORNEY

United States Patent Office 3,134,527

Patented May 26, 1964

3,134,527

TAPE DRIVING MEANS

Jack K. Willis, San Bruno, Calif., assignor to Ampex Corporation, Redwood City, Calif., a corporation of California Filed Jan. 2, 1962, Ser. No. 163,804

8 Claims. (Cl. 226—97)

This invention relates to tape driving means, and particularly to apparatus employing fluid or air pressure differentials to move the tape.

In the magnetic tape recorder art, it has been proposed to effect initial threading of a tape through a tube or channel leading from a supply reel past the transducing heads and to a take-up reel, the tape being moved by means of an air pressure differential applied to the leading end of the tape. Such an operation has been demonstated to be feasible; however, delay and wear of the tape sometimes occurs because the tape has a tendency to move from side to side in the channel, dragging, flapping and beating against the walls.

In another application, air pressure differentials have been used in association with capstan means to provide metering of the tape after threading and during recording and reproduction. Such arrangements require a constant speed motor just as do ordinary capstans and the procedure of threading the tape past the capstan is intricate and time consuming.

Accordingly, it is an object of the present invention to provide fluid or air pressure operated means to drive a tape without the use of a capstan or capstan motor, and particularly to drive the leading end of the tape from a supply to a take-up reel for the threading of the tape thereon.

It is another object of the invention to provide an air pressure operated means for threading a tape without delay of or damage to the tape.

It is a further object of the invention to provide a pneumatic tape driving means capable of starting, threading, driving, stopping and reversing a tape without sticking, binding, dragging, wearing or destruction of the tape.

These and other objects are attained in a structure in which an enclosed channel is provided from the supply to the takeup reel and the tape is driven therethrough by means of differential air pressure directed at a suitable driving angle against one side only of the tape, the other side of the tape being frictionlessly but solidly supported to prevent flapping motion. A portion of the channel is arranged to collapse when the air pressure differential is removed, so as to brake and stop the tape. For reverse movement, the driving air is directed at a suitable reverse driving angle.

Further objects and advantages together with a better understanding of the invention may be had by reference to the following description, taken in conjunction with the accompanying drawing, in which.

Figure 1:
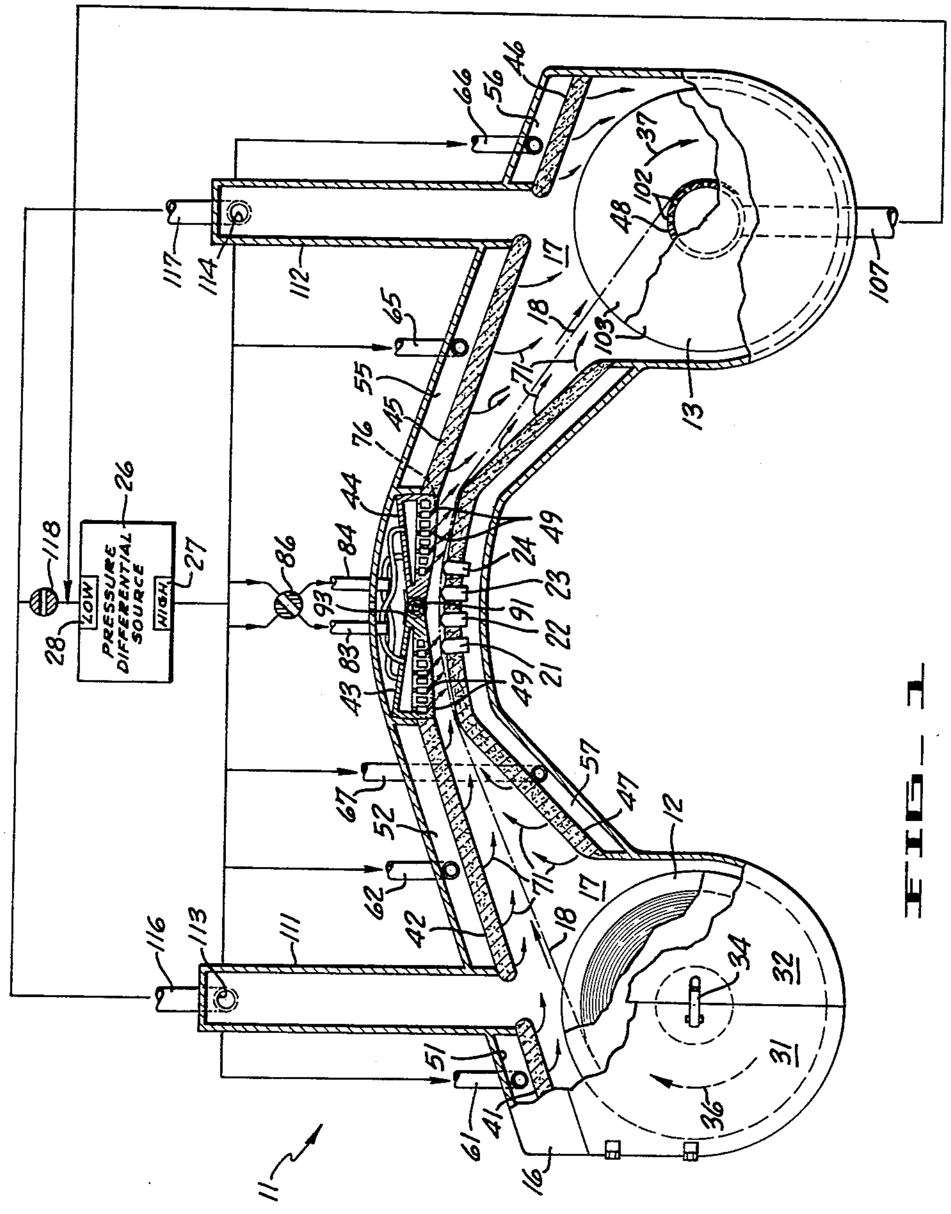
FIGURE 1 is a broken-away front elevation view of a tape transport constructed in accordance with the invention, and illustrating the threading mode of operation.
Figures 5, 6:
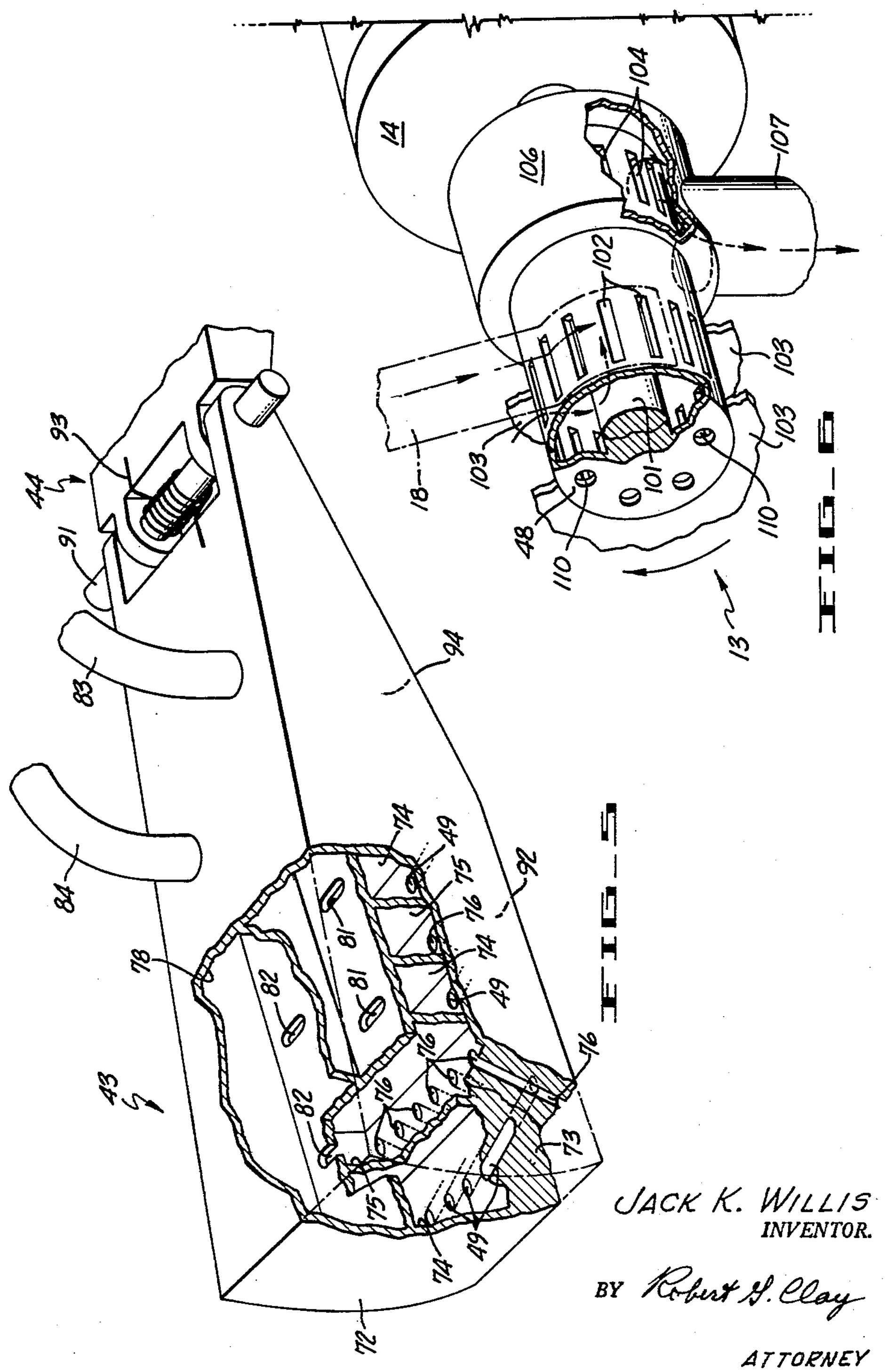
FIGURE 5 is a broken-away perspective view, to an enlarged scale, of a portion of the apparatus shown in FIGURE 1.
FIGURE 6 is a broken-away perspective view, to an enlarged scale, of another portion of the apparatus shown in FIGURE 1.

Referring now to FIGURE 1, there is shown a tape transport 11 including a supply reel 12 and a take-up reel 13 operated by a pair of respective motors 14 (FIGURE 6). The reels 12—13 are enclosed in a unitary housing 16 that defines a channel 17 for the passage of a magnetic tape 18 from the supply reel 12 to the take-up reel 13. Along the path of the tape 18 and midway between the reels, there are positioned a plurality of magnetic transducing heads 21, 22, 23 and 24.

To provide an air pressure differential for use in threading and transporting the tape 18, a differential pressure source 26 is provided. The source 26 has a relatively high pressure side 27 and a relatively low pressure side 28, and may be constructed in any of a number of ways well known in the art. For example, the source 26 may be a suction pump having a suction inlet corresponding to the low pressure side 28 and a high pressure air outlet corresponding to the high pressure side 27. Alternatively the source 26 may be a suction pump having only a low pressure side 28, the high pressure side being open to the ambient atmosphere; or it may be arranged so that the high pressure side 27 is coupled to the system and the low pressure side 28 is open to the ambient atmosphere. In any of these arrangements however it will be seen that the source 26 establishes an air pressure differential between two pressure values one of which may or may not be ambient atmospheric pressure.

When it is desired to assemble the supply reel 12 together with the tape 18 wound thereon in the transport 11 for the purpose of recording or playing the tape, a pair of doors 31 and 32 are opened in the housing 16, and the supply reel 12 is mounted on a keyed spindle (not shown). The doors 31—32 are then closed and latched as by means of a latch 34 so that the housing 16 forms a closed system in which the air pressure differential may be effectively controlled. The motors 14 are then started in a forward or clockwise direction as shown by the arrows 36 and 37; and the source 26 is connected to the housing 16 in such a way as to establish an air pressure differential gradient decreasing from the supply reel 12 and through the channel 17 to the take-up reel 13. The tape 18 coming from the revolving supply reel 12 is then drawn by the flow of air past the transducing heads 21–24 to the take-up reel.

The necessary flow of air is established by coupling the high pressure side 27 of the source 26 to a number of air input elements 41, 42, 43, 44, 45, 46 and 47 forming an interior lining for the housing 16 and in effect defining the channel 17; and by connecting the low pressure side 28 of the source 26 to the hub 48 of the take-up reel 13.

As shown in FIGURE 1, the elements 41, 42, 45, 46 and 47 are made of relatively thick portions of a porous material, for example the porous metal commercially manufactured under the tradename of "Oilite"; or alternatively a porous ceramic material such as is well known in the art The element 43 and 44 are shown as provided with angled opening 49 directed downwardly and also from left to right or in the direction of movement of the tape in forward motion. Thus the air is predisposed to flow from left to right and to drive the tape in such a direction. The porous element 47 forming the lower wall of the channel 17 is particularly arranged to provide anti-friction support and flotation of the tape under the strong driving forces of the air from openings 49. The elements 41, 42, 45, 46 and 47 are supplied as by means of respective supply chambers 51, 52, 55, 56 and 57 defined by the corresponding porous elements and the exterior wall of the housing 16. These chambers 51, 52, 55, 56 and 57 communicate with the high pressure side 27 of source 26 as by means of respective conduits 61, 62, 65, 66 and 67.

It is here noted that a typical characteristic of the porous material is to provide a pressure drop of the air flowing therethrough so that the air coming out into the channel 17 is at a substantially lower pressure than the air coming from the source 26. Consequently the air coming to the channel 17 from the various porous members tends to form a low pressure, evenly distributed lubricating pad of air, indicated by the small arrows 71, and functioning to keep the tape from encountering and sticking against the upper and lower walls of the channel 17 during passage to the take-up reel 13. The main tape driving force represented by the directional air flow is supplied by a combination of the elements 43 and 44 and the low pressure outlet from the hub 48 of the take-up reel 13; and the structure of these elements is described as follows:

Element 43 is shown in FIGURE 5 as a pressure housing 72 provided with a lower wall 73 and defining a number of transverse chambers 74 and 75 directly above the lower wall 73. The transverse chambers 74 are arranged alternately with the chambers 75. Each chamber 74 has a transverse row of openings 49 directed downwardly and toward the right through the lower wall 73. Each chamber 75 has a similar transverse row of openings 76 directed downwardly and toward the left through the lower wall 73. The housing 72 also defines a pair of longitudinal chambers 77 and 78 above the chambers 74—75. The chamber 77 communicates with each of the chambers 74 by means of openings 81 formed in the dividing wall, and the chamber 78 communicates with each of the chambers 75 by means of openings 82. A flexible conduit 83 couples the chamber 77 to a valve 86 (FIGURE 1), and a flexible conduit 84 couples the chamber 78 to the valve 86. As illustrated in FIGURE 1 the valve 86 is actuated during threading in the forward drive mode of operation so as to effect a direct coupling from the high pressure side 27 of the source 26, through conduit 83 and the chambers 77 and 74, and to the angled openings 49; while at the same time the conduit 84 and corresponding reverse angle drive openings 76 are blocked by the valve 86 from communication with the source 26.

The element 43 is pivoted as by means of a pivot pin 91 solidly mounted in the housing 16 midway of the array of transducing heads 21–24, so as to have an at-rest position (illustrated in FIGURE 3) in which a flat lower surface 92 of the element engages the tape 18 and compresses it securely against the element 47 defining the lower portion of the channel 17. The element 44 as shown in the drawing is an exact duplicate of the element 43 and is pivoted on the same pivot pin 91 but faces in an opposite direction. A spring element 93 is mounted on the pin 91 and bears against both of the elements 43 and 44 so as to urge them toward the element 47 even if the transport should be inverted. However, as shown in FIGURE 1, when air under pressure is forced from the source 26 through the angled openings 49, the pressure of the emitted air forces the elements 43 and 44 to pivot upwardly and to leave a space beneath for the passage of the tape 18. When the valve 86 is reversed as shown in FIGURE 4 for reverse operation a similar effect obtains, except that the pressurized air is emitted from the reversely angled openings 76. It is only when the air pressure is entirely shut off from the elements 43—44 as by positioning the valve member in a neutral position (FIGURE 3) that the elements 43—44 engage the tape and lower wall of the channel 17. In this position the elements 43—44 exert a stopping and braking effect on the tape; but it will be seen that the shank portions 94 of the elements 43—44 are angled upwardly towards the pivot pin 91 in such a way as to clear the transducing heads 21–24 even in the stopped or braking position.

Referring now to FIGURE 6, the construction of the take-up reel 13 to receive and hold the tape 18 is shown. The hub 48 of the reel is formed as a hollow cylinder affixed to and supported on a central shaft 101, the latter being coupled to or formed as extension of the output shaft of motor 14. The hub cylinder 48 has formed in the outer cylindrical wall a number of axially aligned slits 102 arranged to be encountered by the tape 18. A pair of reel side flanges 103 are mounted on the hub on either side of the zone of the slits 102. Spaced axially from the zone of slits 102 is another array of slits 104 similarly arranged in the hub cylinder 48; and surrounding and enclosing the zone of slits 104 is a manifold member 106, this member being solidly mounted on the housing 16 and being provided with a conduit 107 leading therefrom to the low pressure side 28 of the source 26. During the first part of the threading operation, the source 26 draws air by suction from the channel 17, through the slits 102 in the rotating hub 48 and into the interior of the hub, thence outwardly through the slits 104 and into the manifold 106, and thence through the conduit 107 to the source 26. Because all of the air in the channel 17 passes out eventually through the slits 102, the leading end of the tape 18 is drawn to the hub and becomes firmly and flatly clamped thereto in such a way as to cover the slits 102. A set of outlet openings 110 may be provided in the end of cylinder 48 to permit escape of air after the threading operation has been completed.

Figure 2:
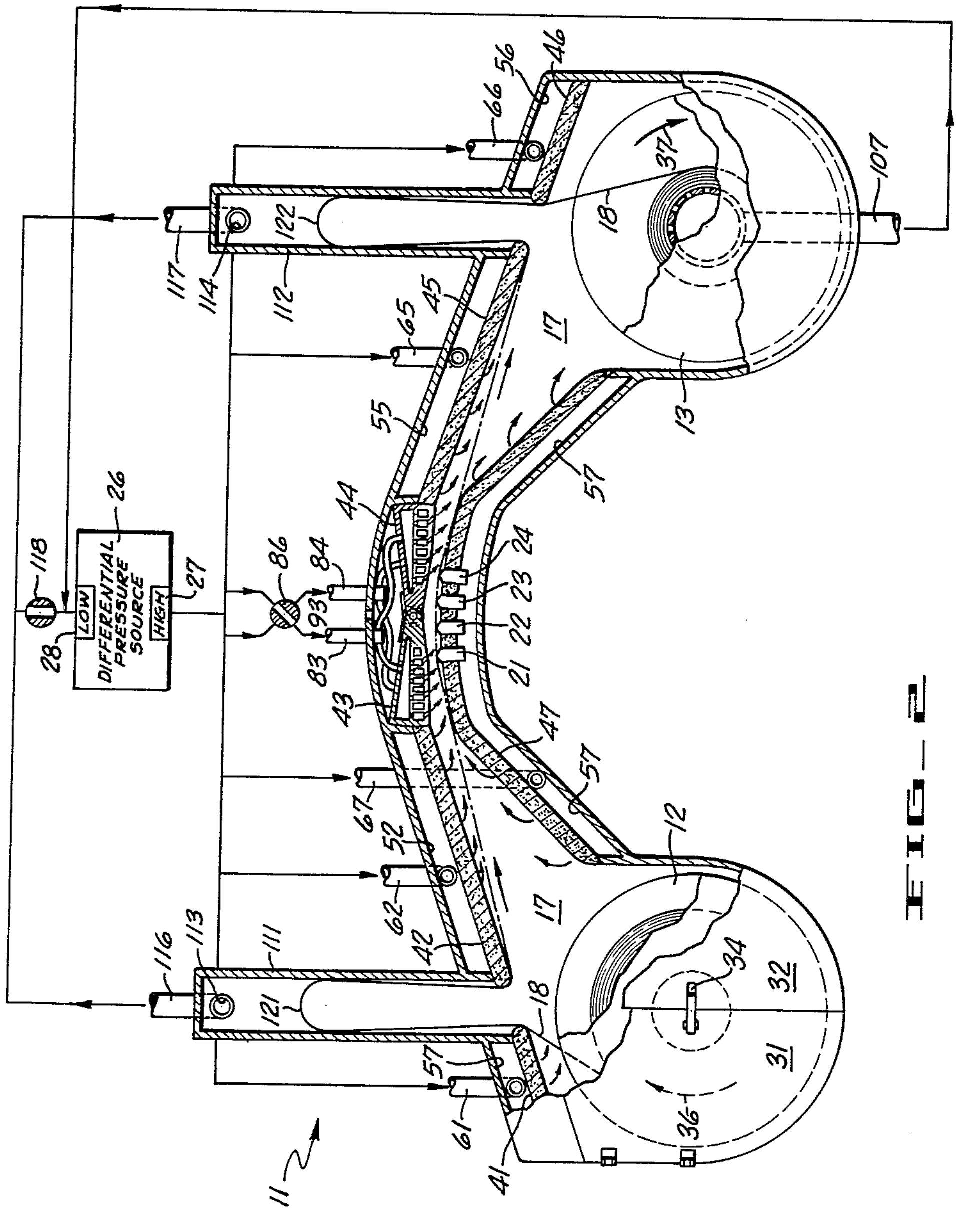
FIGURE 2 is a view similar to that of FIGURE 1 and illustrating the forward recording and reproducing modes of operation.

A pair of slack loop tape columns 111 and 112 are provided communicating with the interior of housing 16 directly over the axes of respective reels 12 and 13 and between respective porous elements 41—42 and 45—46. The upper ends of the columns 111—112 have suction openings 113 and 114 respectively, coupled as by means of a pair of conduits 116 and 117 to a valve 118, which in turn is coupled to the low pressure side 28 of source 26. In the threading mode of operation as shown in FIGURE 1, the valve 118 is closed, so that no air is removed from the channel 17 through the columns 111—112, and so that the tape is directed during the threading process from the reel 12 toward the reel 13. However after the tape has been successfully threaded and ordinarily forward recording or playback of the tape is desired the valve 118 is opened as shown in FIGURE 2, and the tape 18 is pulled into the columns 111—112 to form a pair of slack loops 121 and 122. The operation of the reel motors 14 is controlled by means of a tape loop sensing means, of a type well known in the art and not here shown, so that the loops 121—122 are maintained substantially at a desired medium length. It will be noted also in reference to FIGURE 2 that the porous elements 41—42 both project slightly beyond the mouth of the tape column 111 and are rounded so that guiding of the tape in the loop 121 is accomplished with minimum frictional engagement of the tape on the walls of the columns 111. As the tape enters and leaves the column 111, it floats frictionlessly on the cushion of low pressure air emanating from the rounded ends of elements 41—42. The elements 45—46 are similarly constructed at the mouth of tape column 112.

Figure 3:
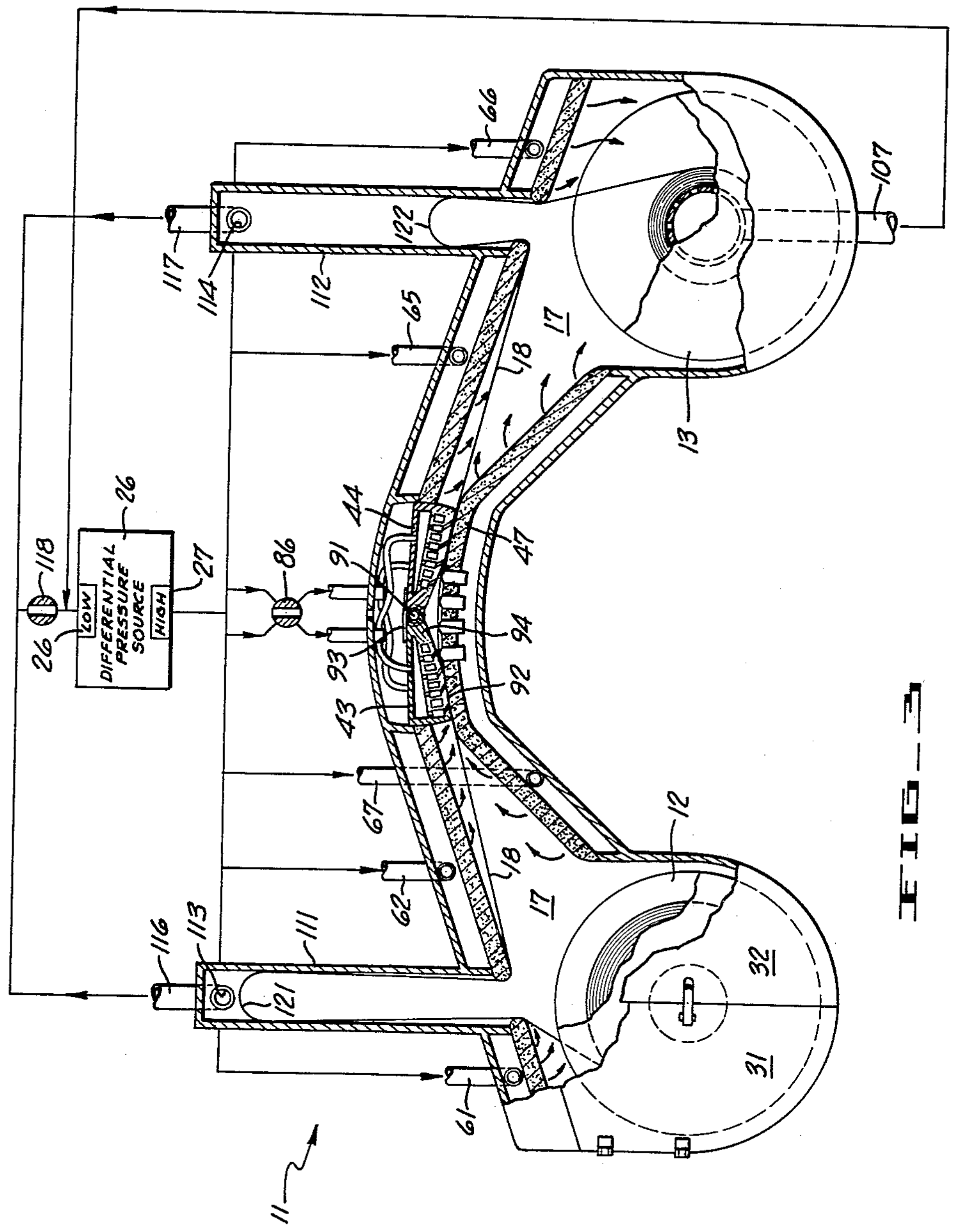
FIGURE 3 is a view similar to that of FIGURE 1 and illustrating the stopping of the tape.
Figure 4:
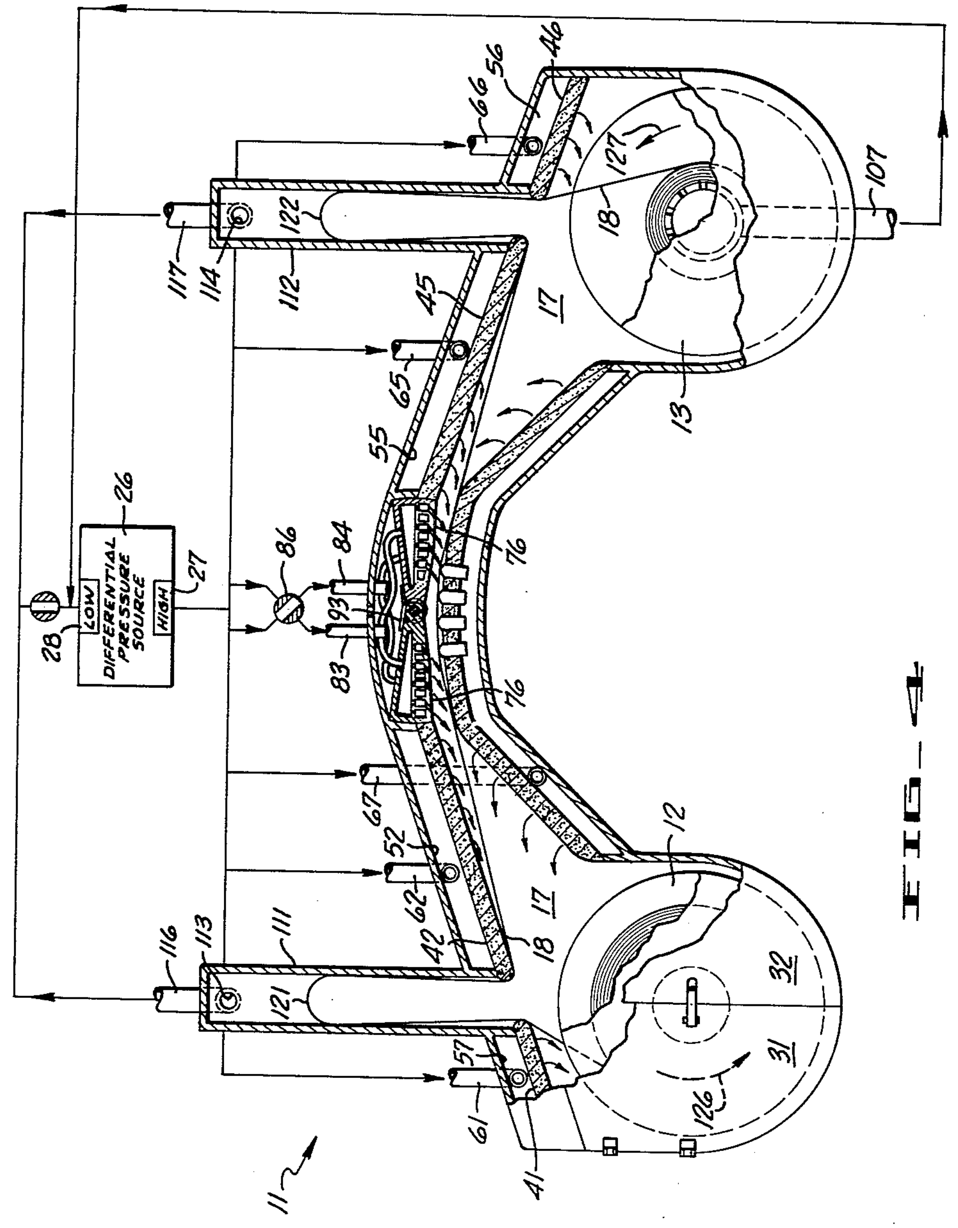
FIGURE 4 is a view similar to that of FIGURE 1 and illustrating the reverse mode of operation.

When it is desired to quickly stop the tape at the transducing heads 21—24, the valve 86 is turned to the neutral position as shown in FIGURE 3 with the result that the tape driving elements 43—44 lose their air pressure and spring toward the lower portion of the tape channel 17, pinching the tape and clamping it firmly thereto. Because the massive tape loaded reels 12 and 13 cannot be stopped so quickly as the comparatively weightless segment of tape at the transducing heads, the tape loop 121 temporarily grows longer and the tape loop 122 temporarily grows shorter. When the reels 12—13 have been stopped however, they may be rotated in a reverse direction to re-establish the tape loops 121—122 in the desired lengths, or re-establishment of the tape loops may be postponed until the apparatus is started again.

If, after stopping, a reverse movement of the tape is desired, the valve 86 is turned to the position illustrated in FIGURE 4, and the reel motors 14 are energized to drive the reels 14 in a counter clockwise direction as indicated by the arrows 126 and 127. The high pressure air coming from the source 26 flows through the valve and conduit 84 to the angled openings 76 of tape driving elements 43—44. The air pressure from the openings 76 causes the elements to pivot away from the tape 18 and to drive the tape to the left toward the reel 12. Because the tape in the vicinity of the heads 21–24 can be thus started much more quickly than the massive reels 12 and 13, the tape loop 121 temporarily grows longer while the loop 122 temporarily grows shorter. However, after the reel motors 14 have brought the reels to a speed slightly greater than the speed of movement of the tape 18, the loops 121—122 are re-established at medium lengths of the reels 12 and 13 are slowed to correct operating speed.

It will be seen that during the driving of the tape by the tape driving elements 43—44 in the threading and normal operating modes, the combined effect of the angled openings 49 (76) on the one side of the tape and the air flowing from the porous member 47 on the other side of the tape is to smoothly drive the tape in the desired direction while firmly and frictionlessly supporting the tape against flapping, sticking and beating engagement with the sides of channel 17. This effect has been found to be realized in practice, essentially because the high pressure driving air is applied to the tape entirely on one side while the low pressure evenly distributed porous air on the other side serves to solidly support the moving tape. It has been found that the pressure of the air at the surface of porous member 47 is not substantially altered even if the tape approaches engagement with the porous member and effectively stops up the air flow from the porous cavities nearest the surface of the member. Thus transient pressure changes at the surface of the porous member are damped out and effectively avoided, with the result that flapping wave motion of the tape near the porous member is also effectively avoided.

Instead of forming member 47 of porous material and coupling the member to the air pressure source 26 the member 47 may be made entirely of solid antifriction material, such as for example, Teflon. Thus, the effect of substantially frictionlessly supporting the tape on one side while driving it with a directed flow of air applied to the other side is still obtained.

Thus, there has been described a tape transport in which an enclosed channel is provided from the supply to the takeup reel and tape is driven therethrough by means of differential air pressure directed at a suitable driving angle against one side only of the tape, the other side of the tape being frictionlessly but solidly supported to prevent flapping motion. The driving air is directed from a pair of pivotable tape driving members held in a retracted position during the driving mode by the pressure of the air emanating therefrom and arranged to pivotably collapse when the air pressure is removed so as to clamp the tape against the supporting member and effectively brake the tape to a stop. For reverse movement of the tape, the pressurized air is directed from the tape driving members at a suitable reverse drive angle.

What is claimed is:

1. Apparatus for driving a tape in a longitudinal direction, said tape having a predetermined thickness, comprising:
   - means for directing a flow of fluid against one side of said tape an din said longitudinal direction for driving said tape; and
   - antifriction means on the opposite side of said tape for providing support for said tape at points spaced in said longitudinal direction for a dimension lying in the range from zero to the order of said tape thickness, said points of support also being distributed across the width of said tape,
   - whereby said tape is supported without flapping during the longitudinal driving thereof.

2. Apparatus for driving a tape in a longitudinal direction, said tape having a predetermined thickness, comprising:
   - means for directing a flow of fluid against one side of said tape and in said longitudinal direction for driving said tape; and
   - means for substantially frictionlessly supporting the opposite side of said tape at points spaced in said longitudinal direction for a dimension lying in the range from zero to the order of said tape thickness, said points of support also being distributed across the width of said tape,
   - whereby said tape is guided without flapping during the longitudinal driving thereof.

3. Apparatus for driving a tape in a longitudinal direction, said tape having a predetermined thickness, comprising:
   - a driving member confronting one side of said tape, said member being provided with a number of nozzle openings directed against said side of said tape and in said longitudinal direction for driving said tape;
   - means for directing a flow of fluid through said nozzle openings and against said tape; and
   - means for substantially frictionlessly supporting the opposite side of said tape at points spaced in said longitudinal direction for a dimension lying in the range from zero to the order of said tape thickness, said points of support also being distributed across the width of said tape,
   - whereby said tape is guided without flapping during the longitudinal driving thereof.

4. Apparatus for driving a tape in a longitudinal direction, said tape having a predetermined thickness, comprising:
   - means for directing a first flow of fluid against one side of said tape and in said longitudinal direction for driving said tape;
   - a guide member confronting said means on the opposite side of said tape; and
   - means for directing a second flow of fluid to the surface of said guide member confronting said tape at points spaced in said longitudinal direction for a dimension lying in the range from zero to the order of said tape thickness, said points of support also being distributed across the width of said tape,
   - whereby said tape is supported without flapping during the longitudinal driving thereof.

5. Apparatus for driving a tape in a longitudinal direction, said tape having a predetermined thickness, comprising:
   - means for directing a first flow of fluid against one side of said tape and in said longitudinal direction for driving said tape;
   - a guide member formed of porous material confronting said means on the opposite side of said tape, said member having pores opening toward said tape across the width thereof and spaced in said longitudinal direction for a dimension lying in the range of from the order of to substantially less than said tape thickness; and means for providing a second flow of fluid through said porous guide member and against said opposite side of said tape,
   - whereby said tape is supported without flapping during the longitudinal driving thereof.

6. Apparatus for driving a tape in a longitudinal direction, comprising:
   - anti-friction means for providing substantially unvarying supporting pressure on one side of said tape;
   - means for selectively directing a flow of fluid against the opposite side of said tape and in said longitudinal direction for driving said tape, said second-named means being mounted for relative movement toward and away from said first-named means; and
   - means for urging said second-named means toward said first-named means,
   - whereby said second-named means is forced away from said first-named means and said tape is driven in said longitudinal direction when said fluid is flowing through said second-named means, but is clamped between said first- and second-named means when said fluid flow is decreased.

7. Apparatus for driving a tape in a longitudinal direction, comprising:

a guide member formed of porous material confronting one side of said tape;

means for providing a first flow of fluid through said porous guide member and against said side of said tape;

means for selectively directing a second flow of fluid against the opposite side of said tape and in said longitudinal direction for driving said tape, said second-named means being mounted for relative movement toward and away from said guide member; and means for urging said second-named means toward said guide mmeber, whereby said second-named means is forced away from said guide member and said tape is supported without flapping and is driven in said longitudinal direction when said fluid is flowing through said second-named means, but is clamped between said second-named means and guide member when said fluid flow is decreased.

8. Apparatus for threading and driving tape in a longitudinal direction, comprising:

a first member formed of porous material and confronting one side of said tape;

second and third members spaced apart and extending from said first member around opposite edges of said tape and defining with said first member a threading and driving channel for said tape;

a fourth member mounted between said second and third members for movement between positions releasing and clamping said tape against said first member, said fourth member being spring loaded toward said clamping position, said fourth member also being provided with a plurality of nozzle openings directed at said tape and in said longitudinal direction;

means for directing a first flow of air inwardly through said first porous member for the stable flotation of said tape; and means for selectively directing a second flow of air inwardly through said nozzle openings of said fourth member and against said tape, whereby said fourth member is caused to move to said tape releasing position and said tape is driven longitudinally in said channel without flapping when said second flow is flowing, but returns to said clamping position when said second flow is stopped.

References Cited in the file of this patent

UNITED STATES PATENTS

| | | |
|---|---|---|
| 2,848,820 | Wallin et al. | Aug. 26, 1958 |
| 2,990,990 | Wilkins et al. | July 4, 1961 |
| 3,032,246 | Fritze | May 1, 1962 |

FOREIGN PATENTS

| | | |
|---|---|---|
| 858,154 | Great Britain | Jan. 11, 1961 |